Oct. 1, 1946.    C. H. INMAN    2,408,648
APPARATUS FOR CLEANING EGGS AND THE LIKE
Filed Aug. 29, 1945    2 Sheets-Sheet 1
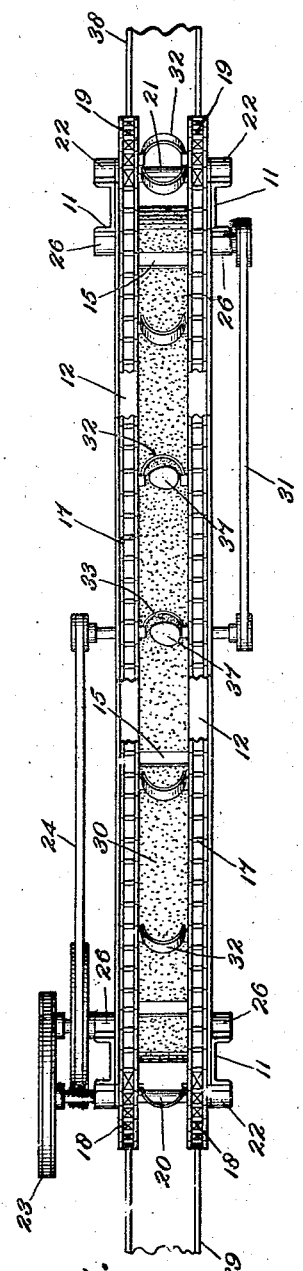
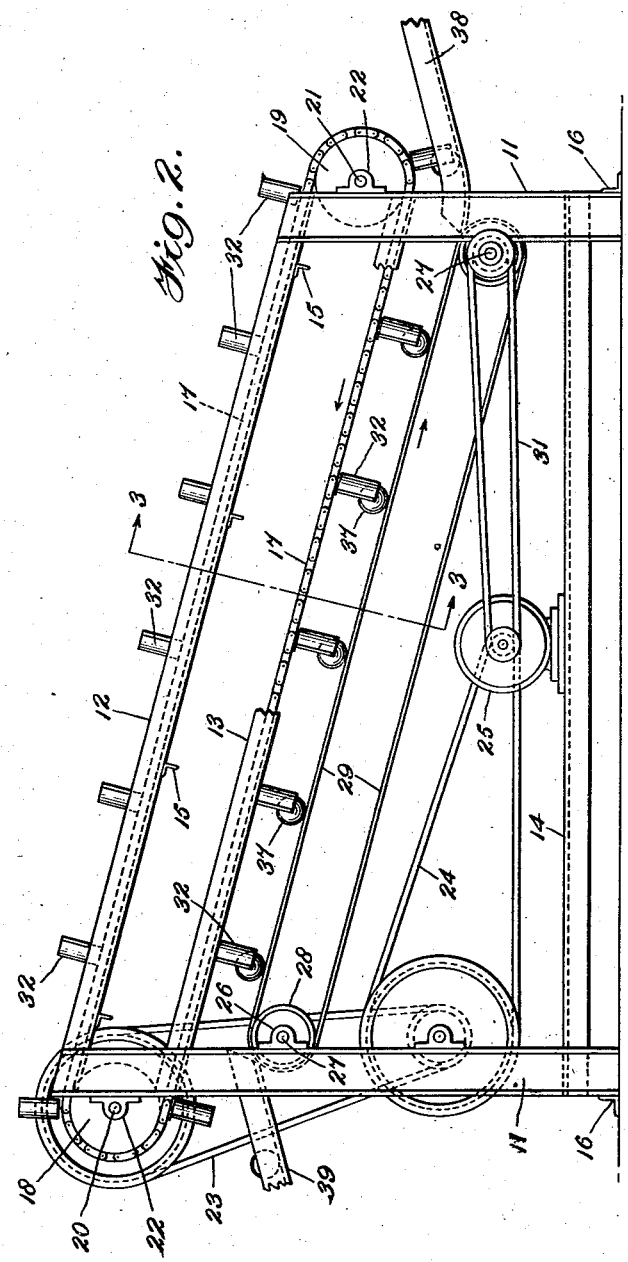
Inventor
Clark H. Inman,
Attorney Oct. 1, 1946. C. H. INMAN 2,408,648
APPARATUS FOR CLEANING EGGS AND THE LIKE
Filed Aug. 29, 1945 2 Sheets-Sheet 2
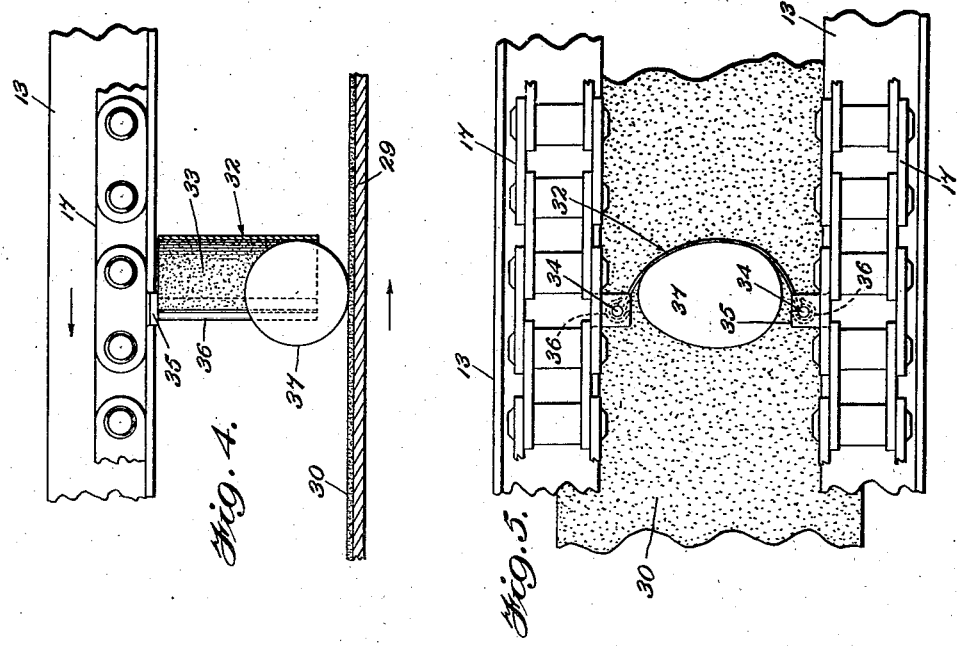
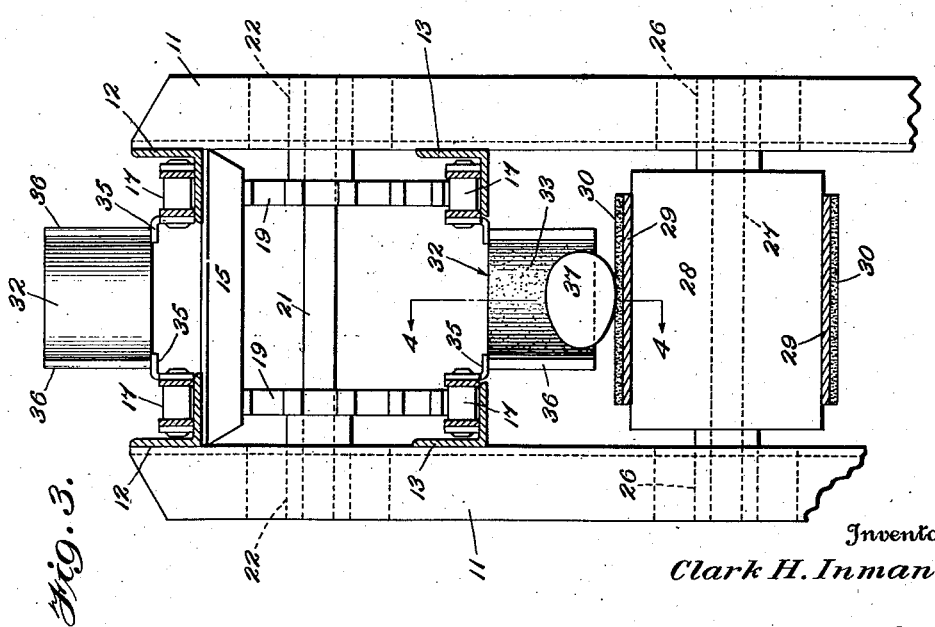
Inventor
Clark H. Inman,
Attorney Patented Oct. 1, 1946

2,408,648

UNITED STATES PATENT OFFICE 2,408,648

APPARATUS FOR CLEANING EGGS AND THE LIKE

Clark H. Inman, Lakewood, N. J.

Application August 29, 1945, Serial No. 613,245

10 Claims. (Cl. 51—138)

The invention relates to apparatus for cleaning the surfaces of eggs and the like, and has for one of its objects the provision of an improved machine for this purpose, of relatively simple and inexpensive construction and which will be more efficient in use than those which have been heretofore proposed.

Essentially the present machine comprises an element, such for example as an endless belt, having an abrasive surface upon which the eggs are supported and over which they are serially advanced by a plurality of moving pocket members of curved cross section which cradle each egg, said members also having an abrasive surface for engagement with the surface of the egg whereby they may contribute to the cleaning action. The supporting surface is preferably inclined to the horizontal and the cradling members move in such direction as to advance the eggs up the incline, with gravitational action tending to retain the eggs in the pockets. The supporting belt is also preferably moved in a direction opposite to that of the advance of the eggs, thereby also tending to keep the latter in the pockets.

An illustrative example of the apparatus is shown in the accompanying drawings forming a part of this specification, in which:

Figure 1 is a top plan view of the machine, partly broken away;

Fig. 2 is a side elevational view of the parts shown in Fig. 1;

Fig. 3 is an enlarged partial cross sectional view, on the plane indicated by the line 3—3 of Fig. 2, looking in the direction of the arrows;

Fig. 4 is a fragmentary vertical sectional view, on the plane indicated by the line 4—4 of Fig. 3, looking in the direction of the arrows; and Fig. 5 is a plan view of the parts shown in Fig. 4.

Referring more particularly to the said drawings, the machine comprises a framework which may include upright members 11, longitudinal member 12, 13 and 14, and transverse members 15 and 16. The longitudinals 12 and 13, which are here shown as of angle iron, are inclined to the horizontal at an angle of about 15°, and respectively serve as supports and guides for the upper and lower runs of sprocket chains 17 which are trained about sprocket wheels 18 and 19 carried by shafts 20 and 21 journalled in bearings 22 carried by the uprights 11. The shaft 20 is driven through speed reducing drives 23 and 24—here shown as of the belt and pulley type— from a motor 25 which may be conveniently mounted on the lower longitudinals 14, see Fig. 2.

The standards or uprights 11 also carry bearings 26 journalling shafts 27 carrying pulleys 28 about which is trained an endless belt 29 the outer face of which is provided in any appropriate manner with a sand, emery or other abrasive surface or layer 30. As will be clear from Fig. 2, the runs of this belt are also inclined, and are substantially parallel to and below the runs of the chains 17. One of the belt shafts 27 is driven from the motor 25 by a belt and pulley drive 31, which preferably imparts to the belt 29 a considerably higher speed than that of the chains 17. The respective drives are such as to move the lower run of the chains 17 from right to left, as viewed in Fig. 2, and the upper run of the belt 29 from left to right, as indicated by the arrows in Figs. 2 and 4.

The chains 17 carry a series of egg moving members or pockets 32 spaced at suitable longitudinal distances along the said chains. These members are here shown as comprising sheets of flexible abrasive material, such for example as sand paper, emery cloth or the like, which are bowed to a substantially semi-cylindrical form with their abrasive surfaces 33 inward, and which are readily removably secured to the chains as by wrapping their lateral edge portions around pins or rods 34 carried by attachment ears 35 with which certain transversely opposed pairs of the chain links are provided. The said wrapped edge portions may be retained on the rods by spring clips 36. By making the pocket members of flexible material they may conform themselves more or less to the varying contours of the eggs 37, as shown in Fig. 4, thereby engaging larger surface areas and enhancing their cleaning action.

Any suitable means may be provided for feeding the eggs to the machine and for delivering them therefrom, and these have been here indicated more or less diagrammatically as a feeding chute or trough 38 and a delivery chute or trough 39.

The operation of the apparatus will be readily apparent from the foregoing, it being understood that the eggs will be supplied to the right hand end of the machine by the feeding device 38, where they will be sequentially picked up by the pocket members 32 and advanced upwardly along the upper run of the belt 29, which serves as a support for the eggs. By reason of their ovate shape the eggs of course will not turn true about their longitudinal axes, but will wobble and may even turn end over end at times. This, together with the contour accommodation afforded by the flexibility of the cradles 32, insures that the entire surface area of the eggs will be brought into cleaning engagement with one or both of the abrasive surfaces 30 and 33 and that the eggs will be thoroughly cleaned by the time they reach the left hand end of the machine, where they will be discharged to the delivery chute or mechanism 39. The downward inclination of the belt 29, as well as its motion in a direction opposite to that in which the eggs are advanced, both tend to prevent the eggs from leaving the pockets 32.

While as here shown, the machine is intended to operate dry, it will be readily understood that if the adhesive by which the sand, emery or other abrasive is attached to its carrying element is liquid proof, water may be supplied if desired for the purpose of allaying dust and/or to assist in the cleansing. Also, although the machine is here shown as capable of handling but a single line of eggs, it may be readily constructed in duplicate or multiple units to handle a plurality of lines side by side.

Thus, while one form of the invention has been illustrated and described, it will be obvious that those skilled in the art may vary the details of construction as well as the precise arrangement of parts without departing from the spirit of the invention, and therefore it is not wished to be limited to the above disclosure except as may be required by the claims.

What is claimed is:

1. In apparatus for cleaning eggs and the like, an egg-supporting element having an abrasive surface for engagement with the eggs; pocket members for cradling and advancing the individual eggs over said surface, said pocket members also having an abrasive surface engageable with the eggs; and means for moving the pocket members relative to the supporting element.

2. In apparatus for cleaning eggs and the like, an element having an abrasive surface for supporting the eggs; means for moving said element in a determined direction; pocket members for receiving and cradling the eggs while the latter are supported by said surface, said members also having an abrasive surface engageable with the eggs; and means for moving said pocket members in substantial parallelism with the supporting surface of said element and in a direction opposite to the movement of the latter.

3. In apparatus for cleaning eggs and the like, an egg-supporting element inclined to the horizontal and having an abrasive surface over which the eggs may be traversed; pocket members for receiving and cradling the eggs while the latter are supported by said surface, said members also having an abrasive surface engageable with the eggs; and means for moving the pocket members to traverse the eggs over the abrasive surface of the inclined supporting element from the lower portion toward the higher portion of the latter.

4. In apparatus for cleaning eggs and the like, a movable egg-supporting element inclined to the horizontal and having an abrasive surface over which the eggs may be traversed; pocket members for cradling the eggs while the latter are supported by said element surface, said members also having an abrasive surface engageable with the eggs; means for moving the pocket members to traverse the eggs over the abrasive surface of the inclined supporting element from the lower portion toward the higher portion thereof; and means for moving the supporting element in a direction opposite to the travel of the egg-containing pockets.

5. Cleaning apparatus according to claim 4, wherein the pocket members comprise flexible abrasive-carrying material.

6. In apparatus for cleaning eggs and the like, an endless belt having an abrasive egg-supporting surface; spaced egg-cradling pocket members mounted for movement substantially parallel to said egg-supporting surface, said members also having an abrasive surface engageable with the eggs; and means for moving the supporting surface of the belt and the egg-containing pocket members in opposite directions.

7. In apparatus for cleaning eggs and the like, an endless belt having an abrasive egg-supporting surface mounted for movement in a plane inclined to the horizontal; spaced egg-cradling pocket members mounted for movement substantially parallel to said egg-supporting surface, said members also having an abrasive surface engageable with the eggs; means for driving the belt to move the egg-supporting surface thereof downwardly of the incline; and means for moving the egg-containing pocket members upwardly of the incline.

8. Cleaning apparatus according to claim 6, wherein the pocket members comprise curved flexible abrasive-carrying material.

9. In apparatus for cleaning eggs and the like, an endless belt having an abrasive egg-supporting surface; endless chain means having a run disposed for travel above and in substantial parallelism with the supporting surface of said belt; a plurality of pocket members carried by and spaced longitudinally along said chain means for cradling the eggs when supported by said belt surface, said members also having an abrasive surface engageable with the eggs; and means for driving said belt and said chain means to simultaneously move the egg-supporting surface and the egg-containing pocket members in opposite directions.

10. Cleaning apparatus according to claim 9, wherein the pocket members comprise curved flexible abrasive-carrying material attached to transversely spaced pins carried by the chain means.

CLARK H. INMAN.